Feb. 27, 1973   J. W. JOYCE, JR., ET AL   3,718,044
FLOW METER FOR INDIRECTLY MEASURING THE
FLOW OF BLOOD FROM A BLOOD PUMP
Filed Dec. 7, 1971
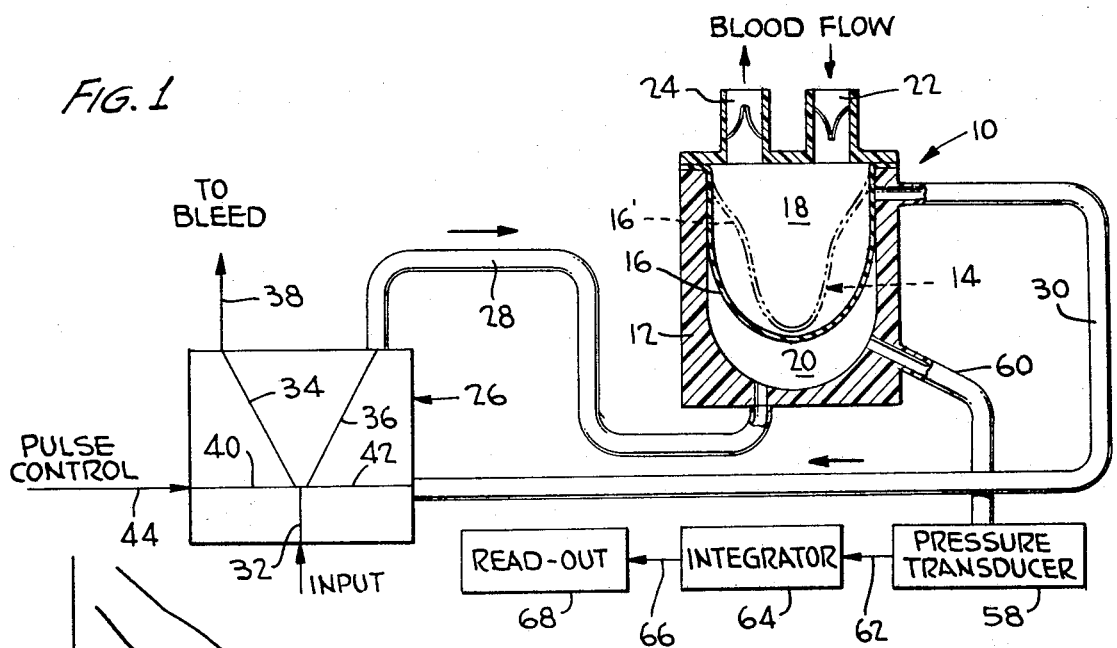
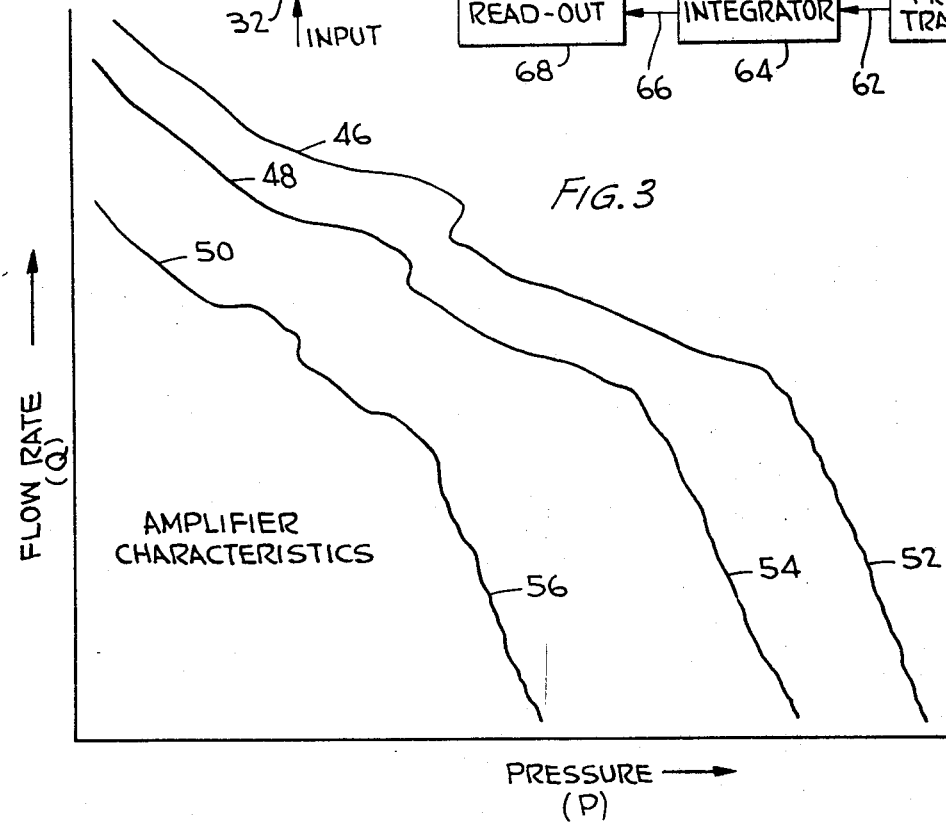
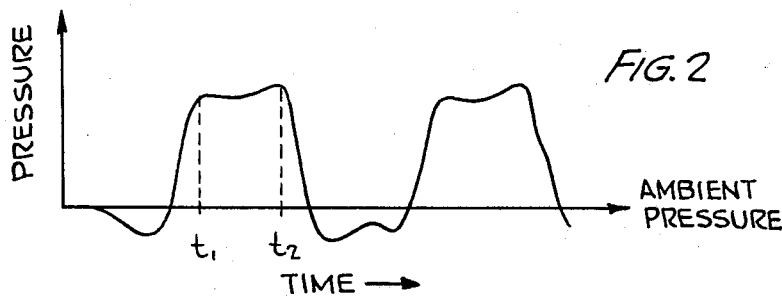
INVENTORS,
JAMES W. JOYCE, JR.
FERNANDO VILLARROEL
BY
Harry M. Saragovitz
Edward J. Kelly
Herbert Berl
Saul Elbaum
ATTORNEYS

United States Patent Office
3,718,044
Patented Feb. 27, 1973

3,718,044
FLOW METER FOR INDIRECTLY MEASURING THE FLOW OF BLOOD FROM A BLOOD PUMP
James W. Joyce, Jr., Rockville, and Fernando Villarroel, Bowie, Md., assignors to the United States of America as represented by the Secretary of the Army
Filed Dec. 7, 1971, Ser. No. 205,618
Int. Cl. G01f 1/00
U.S. Cl. 73—223                          3 Claims

ABSTRACT OF THE DISCLOSURE

A flow meter is disclosed which indirectly measures the flow of blood from a blood pump without the necessity of entering the blood stream itself to secure a measurement. The flow meter is contemplated to be utilized in conjunction with a pulsatile blood pump of the type comprising a fixed volume cavity divided by a flexible member into a first chamber filled with blood and a second chamber, and wherein the blood in the first chamber is expelled by the pump upon compression of the flexible member by means of fluid pulses delivered by a fluid amplifier and applied to the second chamber. The instantaneous pressure of fluid in the second chamber is sensed and a signal is produced representative of the time varying value thereof. This signal is subsequently integrated to produce an output signal representative of the volume of fluid flow into the second chamber of the pump and thus the volume of blood flow from the first chamber of the pump since, in such a system, the volume of air that enters the second chamber during each cycle of pump operation is related to the volume of blood expelled from the first chamber.

---

The invention described herein may be manufactured, used and licensed by or for the United States Government for governmental purposes without the payment to use of any royalties thereon.

This invention generally relates to fluid flow meters and particulaly concerns a flow meter for indirectly measuring the flow of blood from a blood pump.

Pulsatile-type extracorporeal blood pumps have been designated for the purpose of augmenting heart action and such pumps produce an output pulse of blood which output closely resembles that of the human heart. Such pumps may or may not be under control of a cardiac programmer. Such pumps have found widespread utility in various medical arts.

In most medical applications, the flow rate, volume, and other characteristics of blood expelled from the pump must be known and, to achieve such flow determination, relatively complex and expensive prior art flow meters have been designed and used. For the most part, such flow meters require a connection to the output side of the blood pump itself, i.e., into the blood stream issuing from the pump.

With this background in mind, the instant invention contemplates, as the primary objective thereof, the provision of a flow meter for a blood pump of the type discussed which will determine the average output flow rates of the pump without the necessity of entering the output blood stream.

A still further objective of the instant invention concerns the provision of a flow meter as described, which flow meter is relatively inexpensive compared with prior art types and which flow meter is of relatively simple construction.

These objects as well as others which will become apparent as the description proceeds are implemented by the subject invention which, as aforestated, comprises a flow meter which serves to indirectly measure the flow of blood from a blood pump and which does not require an entry into the output blood stream itself.

The flow meter of the instant invention has specific utility with a pulsatile blood pump of the type which comprises a fixed volume cavity divided by a flexible member or membrane into first and second internal chambers. The first chamber is contemplated to be filled with blood and has inlet and outlet port means communicating therewith for the entry and exit of flow from the pump. The second chamber in the fixed volume cavity is coupled to a fluid amplifier which applies periodic fluid pulses to the second chambers so as to compress the flexible member or membrane. Blood in the first internal chamber is expelled by the pump upon compression of the flexible member or membrane in this fashion.

In a system of the type described, the volume of fluid which enters the second pump chamber during each cyclic operation of the pump is related to the volume of blood expelled from the second internal chamber of the pump. With this consideration and bearing in mind the interrelationship between fluid flow in the second chamber and output blood flow from the first chamber, the instant invention proposes to indirectly measure the output blood flow without entering the output blood stream by directly measuring the flow characteristic of fluid in the second chamber, which fluid flow brings about the output blood flow in the above-described manner.

Specifically, and in the preferred inventive embodiment, the instantaneous pressure of fluid in the second chamber of the blood pump is measured and a time varying signal representative of the value thereof is generated. This time varying signal is then modified and integrated in a manner to be discussed hereinbelow to produce an output signal which is indicative of the volume of fluid flow into the second chamber of the pump and thus the volume of blood flow expelled from the first chamber of the pump during each cycle or pulse of operation. This output signal itself can be modified to provide a display representative of the savings volume blood flow rate of the pump, or a display representative of the volume of blood from the pump, as desired.

The invention itself will be better understood and further advantages and features thereof will become apparent from the following detailed description of a preferred inventive embodiment, such description referring to the appended sheet of drawings, wherein:

FIG. 1 is a schematic diagram of a pulsatile blood pump system, which system utilizes a flow meter constructed and connected in accordance with the principles of the instant invention;

FIG. 2 is a graphical illustration of the time varying pressure characteristics of fluid in a portion of the blood pump depicted in FIG. 1; and FIG. 3 is a graphical illustration of the flow-pressure characteristics of a typical fluid amplifier of the type utilized in the system of FIG. 1 to drive the blood pump.

Referring now to the drawings, attention is particularly directed to FIG. 1 thereof wherein a pulsatile blood pump system is illustrated. The blood pump itself is generally designated by reference numeral 10 and will be seen to comprise a housing 12 including a hollowed-out, fixed volume cavity 14. Cavity 14 is divided by a flexible member or membrane 16 into a first internal chamber 18 and a second internal chamber 20.

The first internal chamber 18 is adapted to be filled with blood and communicates with an external blood flow system via inlet valve means 22 and outlet valve means 24 of any suitable construction.

The second internal chamber 20 communicates with an external fluid pulsing device such as fluid amplifier means 26 via an inlet connecting line 28 and an outlet connecting line 30. In the "normal" position of the flexible member or membrane 16 as illustrated in FIG. 1, the outlet exit line 30 is blocked by the flexible membrane 16 itself.

Fluid amplifier means 26 is of any suitable type having a supply input or power nozzle 32, receiver lines 34 and 36 respectively communicating with an external bleed 38 and with the inlet connector line 28 leading to the pump 10. The fluid amplifier means 26 further includes two control port lines 40 and 42 respectively coupled to ambient pressure or an external control source 44 and the outlet connector line 30 of the pump 10.

In operation of the above-described system, it initially is to be assumed that a fluid, such as air, is entering the fluid amplifier means 26 through the power nozzle 32 thereof and is exiting via receiver line 36 and, via the connecting line 28, would serve to build up pressure in the second internal chamber 20 of the blood pump 10. At this time, it is further assumed that the first internal chamber 18 of the blood pump means 10 is filled with blood.

Application of pressure to the second internal chamber 20 of the blood pump 10 serves to compress or, more specifically, collapse the flexible member or membrane 16 such that the flexible member 16 assumes the dotted line position 16' within the blood pump 10. Such compression of the flexible member 16 serves to expel blood within the second chamber 18 through the outlet port 24 of the pump 10. Further, it should be noted that when the flexible member 16 assumes the position depicted by the dotted lines designated by numeral 16', the outlet connecting line 30 then is allowed to communicate with the interior of the second chamber 20 and, as such, pressure is applied via the connecting line 30 to control port means 42 of the fluid amplifier 26.

Such pressure applied to the control port means 42 causes the input power stream from power nozzle 32 to switch to the output receiver line 34 and then to the external bleed 38. The pressure in the second internal chamber 20 of the pump 10 then drops and, in fact, will be made negative (below ambient) by the entrainment of air from receiver line 36 by the jet issuing from receiver line 34. In any event, the drop of pressure in the second chamber 20 of the pump 10 causes the flexible member of membrane 16 to assume its full-line position once again and, in so doing, causes blood to flow into and refill the first internal chamber 18 via the inlet port means 22. When the internal chamber 18 is sufficiently filled with blood to again cause the flexible member or membrane 16 to cover the port connected to line 30, the pressure in control port 40 becomes greater than the pressure in control port 42, and the power stream is switched from output receiver 34 to output receiver 36 to begin a new cycle.

With a system of the type above-described, it should be apparent that the volume of fluid such as air which enters the second internal chamber 20 during each cycle of pump operation is related to the volume of blood squeezed out or ejected from the first internal chamber 18.

As such, it is possible to learn of and determine the output blood flow rate of the pump 10 in an indirect manner which does not require a connection to the external blood stream itself, but which merely requires a sensing of the flow characteristics of fluid into the second internal chamber 20. The flow meter of the instant invention is such as to utilize this indirect measurement principle.

In this respect, and for purposes of explanation, attention is now directed to FIG. 2 of the appended drawings wherein the internal pressure appearing within chamber 20 of the pump 10 is illustrated as a function of time. Specifically, such curve represents the application to internal chamber 20 of a plurality of input pressure pulses each commencing approximately at a time $t_1$ and ending approximately at time $t_2$, the period between times $t_1$ and $t_2$ being the systolic or positive pumping duration of the pump 10. Measurement of such pressure pulses can readily be effected simply through connection of a measuring instrument into the second internal chamber 20 of the pump. Yet, as stated above, one appears to require knowledge of the volume, not pressure, of the fluid entering internal chamber 20 so as to correlate this volume with the output blood flow volume from the pump itself. However, the pressure within the second internal chamber 20 of pump 10 is, in fact, functionally related to the volume of fluid entering the chamber 20 in the system of the type described and, since the instant invention contemplates to utilize a fluid pressure measurement since such a measurement is simpler to effect, we will digress here for a moment to develop the functional relationship between measured pressure and fluid volume flowing into the chamber 20 of the pump 10 during each cycle of operation.

In this respect, attention is now directed to FIG. 3 of the appended drawings wherein typical pressure-flow load curves for a typical fluid amplifier such as fluid amplifier 26 is illustrated. A family of such curves are shown with each curve 46, 48, and 50, for example, being that obtained at a particular value of power input or power nozzle pressure. For each such curve, it is apparent that in the low flow region such as regions 52, 54, and 56 of respective curves 46, 48, and 50, the output pressure from the fluid amplifier receiver line is a linear function of output fluid flow. Since, from the type of curves depicted in FIG. 2, it is apparent that the fluid amplifier means 26 is operated in the linear pressure flow region during most of the pumping cycle, i.e., the upper portion of the pressure curve for the pump, the relationship between the standard volume rate of fluid flowing to chamber 20 of pump 10 during each cycle and the pressure of such fluid is as follows:

$$Q = -aP + b \qquad (1)$$

wherein Q is the standard volume flow rate, P is the pressure of the fluid, and $a$ and $b$ are positive constants that can readily be determined by the specific load curves, such as curves 46, 48, and 50, of a given fluid amplifier 26.

By virtue of Equation 1 above, the fluid pressure within chamber 20 and the standard volume rate of fluid flowing into such chamber during each cycle of operation has been linearly related and is contemplated to be utilized in a manner to be described. From a structural point of view, the instant invention contemplates the provision of pressure transducer means 58 and coupled to the internal chamber 20 of the pump 10 via connecting line 60, the pressure transducer 58 sensing the instantaneous pressure of fluid in the second chamber 20 of the pump 10 and generating a time varying signal P representative of the value thereof on line 62.

As mentioned above, the standard volume of fluid entering the chamber 20 during each pulse of operation is related to the volume of blood squeezed out or expelled from the chamber 18. More specifically, and from a more accurate technical point of view, that portion of the initial pressure rise prior to time period $t_1$ and subsequent to time period $t_2$ does not significantly contribute to the actual ejection of blood from chamber 18. Yet, since this unusable time period is so small, i.e., 0.1 second or less compared to the total duration of a typical pulse, i.e., 0.4 second or greater, this technical consideration can largely be ignored, and the standard volume of fluid entering the chamber 20 which is related to the volume of blood pumped from chamber 18 can be mathematically described as:

$$V = \int_{t_1}^{t_2} Q\,dt \qquad (2)$$

where V equals the standard volume of air entering chamber 20, where Q equals the standard flow rate of fluid entering chamber 20 as above-discussed, and wherein $t_1$ and $t_2$ are the respective starting and end points of each pulse cycle of operation, also as discussed.

Substituting Equation 1 into Equation 2 yields the following expression for the standard volume of fluid flowing into chamber 20 in terms of the time varying pressure of the fluid in chamber 20 as follows:

$$V = -a\int_{t_1}^{t_2} P\,dt + b(t_2 - t_1) \quad (3)$$

From a structural point of view, the instant invention contemplates the provision of electronic means such as integrator means 64 which accepts the time varying pressure signal P on line 62 from the transducer 58 and, from such signal, generates an output signal on line 66 having a value representative of the quantity expressed by Equation 3 hereinabove.

Once the actual standard volume of fluid entering chamber 20 has been thus determined, the signal on output line 66 of integrator means 64 representative thereof can be multiplied by an appropriate compressibility factor to determine the corresponding actual change in volume of chamber 20, and hence, the volume of blood ejected from chamber 18. This volume of blood ejected from chamber 18 can, in turn, be multiplied by the pump pulse rate to yield the average volume flow rate of blood produced by the pump, or can be utilized directly as individual stroke volume itself. In this respect, the instant invention contemplates the provision of a read-out means 68 which accepts the signal on output line 66 and provides a read-out signal or display proportional to such output signal on line 66 in whatever units are desired, such display being representative of the average volume blood flow rate of the pump or, alternatively, being representative of the volume of blood flow from the pump in accordance with the needs of the operator.

The actual hardware utilized as the pressure transducer 58, the integrator 64, and the read-out means 68 described in FIG. 1 forms no part of the instant invention as many different conventional and well-known components can be used. For exampe, pressure transducer 58 could comprise a solid-state device or, alternatively, an electro-mechanical diaphragm measuring transducer device. Integrator 64 could comprise a special purpose computer, either analogue or digital, constructed of conventional logic components to perform the integration and/or multiplication function. Similarly, read-out means 68 could comprise any desired visual display, such as a graphic recorder or the like.

It should be understood that the invention is not limited to the exact details of construction shown and described herein for obvious modifications will occur to persons skilled in the art. Accordingly, what is claimed is:

1. In a system utilizing a pulsatile blood pump of the type comprising a fixed volume cavity divided by a flexible member into a first chamber filled with blood and a second chamber, and wherein the blood in the first chamber is expelled by the pump upon compression of the flexible member by means of fluid pulses delivered by a fluid amplifier and applied to the second chamber, the improvement comprising:

flow meter means for measuring the flow of blood from the pump, said flow meter means including:

transducer means for sensing the instantaneous pressure of fluid in the second chamber of the pump and for generating a time varying signal (P) representative of the value thereof;

electronic means into which said time varying signal is applied for generating an output signal representative of the quantity $$\left[ -a\int_{t_1}^{t_2} P\,dt + b(t_2 - t_1) \right]$$

wherein ($a$) and ($b$) are positive predetermined constants and wherein ($t_1$) and ($t_2$) are the repective values of time indicative of the approximate start and finish of a fluid pulse; and read-out means for providing a read-out signal proportional to said output signal of said electronic means, said read-out signal being representative of the value of the blood flow from the pump.

2. The improvement defined in claim 1, wherein said read-out signal is representative of the average volume blood flow rate of the pump.

3. The improvement defined in claim 1, wherein said read-out signal is representative of the volume of blood flow from the pump.

References Cited
UNITED STATES PATENTS

| | | | |
|---|---|---|---|
| 3,208,448 | 9/1965 | Woodward | 128—1 D |
| 3,491,377 | 1/1970 | Bolie | 3—DIG. 2 |
| 3,570,474 | 3/1971 | Jonson | 128—2.05 V |

OTHER REFERENCES

K. W. Hiller et al.: An Electronic-Mechanical Control for an Intrathoracic Artificial Heart, The American Journal of Medical Electronics, July-September 1963, pp. 212–221.

RICHARD C. QUEISSER, Primary Examiner

J. P. BEAUCHAMP, Assistant Examiner

U.S. Cl. X.R.

3—1, DIG. 2; 128—1 R